(12) United States Patent
Savu et al.

(10) Patent No.: US 10,167,356 B2
(45) Date of Patent: Jan. 1, 2019

(54) FLUORINATED POLYMERS COMPRISING PHOSPHONIC MOIETIES

(71) Applicant: 3M INNOVATIVE PROPERTIES COMPANY, St. Paul, MN (US)

(72) Inventors: Patricia M. Savu, Maplewood, MN (US); George W. Griesgraber, Eagan, MN (US); Kim M. Vogel, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/525,772

(22) PCT Filed: Dec. 4, 2015

(86) PCT No.: PCT/US2015/063942
§ 371 (c)(1),
(2) Date: May 10, 2017

(87) PCT Pub. No.: WO2016/099952
PCT Pub. Date: Jun. 23, 2016

(65) Prior Publication Data
US 2018/0305482 A1    Oct. 25, 2018

Related U.S. Application Data

(60) Provisional application No. 62/093,562, filed on Dec. 18, 2014.

(51) Int. Cl.
| | |
|---|---|
| C08F 214/18 | (2006.01) |
| C08F 220/24 | (2006.01) |
| C08F 220/38 | (2006.01) |
| C08F 230/02 | (2006.01) |
| C09D 127/12 | (2006.01) |
| C09D 143/02 | (2006.01) |

(52) U.S. Cl.
CPC ........ C08F 214/182 (2013.01); C08F 214/18 (2013.01); C08F 220/24 (2013.01); C08F 220/38 (2013.01); C08F 230/02 (2013.01); C09D 127/12 (2013.01); C09D 143/02 (2013.01); C08F 2220/387 (2013.01)

(58) Field of Classification Search
CPC ........ C08F 8/40; C08F 220/22; C08F 220/36; C08F 20/22; C08F 14/185; C08F 220/10; C08F 220/18; C08F 230/02
USPC .................................................. 428/457, 702
See application file for complete search history.

(56) References Cited

U.S. PATENT DOCUMENTS

| | | |
|---|---|---|
| 3,094,547 A | 6/1963 | Heine |
| 5,414,102 A | 5/1995 | Pohmer |
| 5,447,982 A | 9/1995 | Kamba |
| 5,550,277 A | 8/1996 | Paciorek |
| 6,824,882 B2 | 11/2004 | Boardman |
| 6,894,105 B2 | 5/2005 | Parent |
| 7,662,896 B2 | 2/2010 | Savu |
| 7,678,426 B2 | 3/2010 | Flynn |
| 8,945,712 B2 | 2/2015 | Dams |
| 2003/0073588 A1 | 4/2003 | Howell |
| 2004/0024100 A1 | 2/2004 | Parent |
| 2005/0048288 A1 | 3/2005 | Flynn |
| 2007/0197717 A1 | 8/2007 | Ueda |
| 2009/0149616 A1 | 6/2009 | Audenaert |
| 2010/0018659 A1 | 1/2010 | Hupfield |
| 2010/0032625 A1 | 2/2010 | Kupsky |
| 2010/0179262 A1 | 7/2010 | Dams |
| 2010/0183889 A1* | 7/2010 | Dams ........................ C08F 8/40 428/457 |
| 2011/0247823 A1 | 10/2011 | Dams |
| 2013/0216837 A1 | 8/2013 | Iyer |
| 2014/0011913 A1 | 1/2014 | Du |

FOREIGN PATENT DOCUMENTS

| | | |
|---|---|---|
| JP | 58041995 | 3/1983 |
| JP | 59129295 | 7/1984 |
| JP | 60262870 | 12/1985 |
| JP | 61243850 | 10/1986 |
| JP | 05320682 | 12/1993 |
| JP | 06055545 | 3/1994 |

(Continued)

OTHER PUBLICATIONS

Bressy-Brondino, "Adhesive and Anticorrosive Properties of Poly(vinylidene fluoride) Powders Blended with Phosphonated Copolymers on Galvanized Steel Plates", Journal of Applied Polymer Science, 2002, vol. 83, pp. 2277-2287.

David, "Recent Progress on Phosphonate Vinyl Monomers and Polymers Therefore Obtained by Radical (Co)Polymerization", Polymer Chemistry, 2012, vol. 03, pp. 265-274.

Moszner, "Chemical Aspects of Self-Etching Enamel-Dentin Adhesives: A Systematic Review", Dental Materials, 2005, vol. 21, pp. 895-910.

(Continued)

*Primary Examiner* — William K Cheung
(74) *Attorney, Agent, or Firm* — Kent S. Kokko; Julie Lapos-Kuchar

(57) ABSTRACT

Described herein is a polymer derived from
(a) a fluorinated monomer selected from
  (i) $C_nF_{(2n+1)}(CH_2)_zOC(\!=\!O)CR\!=\!CH_2$ wherein n is an integer selected from 1 to 8, z is an integer selected from 1 to 20, and R is H or $CH_3$; and
  (ii) $C_nF_{(2n+1)}SO_2(NR')(CH_2)_zOC(\!=\!O)CR\!=\!CH_2$ wherein n is an integer selected from 1 to 8; z is an integer selected from 2 to 20, and R is H or $CH_3$ and R' is H or C1-C8 alkyl group; and
(b) a monomer comprising a phosphonic moiety, along methods thereof and articles comprising such polymer.

18 Claims, No Drawings

(56) References Cited

FOREIGN PATENT DOCUMENTS

| JP | 2003026734 | 1/2003 |
|---|---|---|
| WO | WO 2001-30873 | 5/2001 |
| WO | WO 2003-099904 | 12/2003 |
| WO | WO 2005-105872 | 11/2005 |
| WO | WO 2009-088604 | 7/2009 |

OTHER PUBLICATIONS

Yuan, "Contact Angle and Wetting Properties", Surface Science Techniques, 2013, pp. 3-34.
International Search Report for PCT International Application No. PCT/US2015/063942, dated Mar. 3, 2016, 3 pages.

* cited by examiner

FLUORINATED POLYMERS COMPRISING PHOSPHONIC MOIETIES

CROSS REFERENCE TO RELATED APPLICATIONS

This application is a national stage filing under 35 U.S.C. 371 of PCT/US2015/063942, filed Dec. 4, 2015, which claims the benefit of U.S. Application No. 62/093,562, filed Dec. 18, 2014, the disclosure of which is incorporated by reference in its/their entirety herein.

TECHNICAL FIELD

Described herein are polymers derived from fluoromonomers and monomers comprising a phosphonic moiety and methods of using. Such polymers can be used as release coatings for surfaces, especially metallic surfaces.

SUMMARY

There is a desire for new fluoropolymer compositions for use on metallic substrates, which are less expensive, more robust, and/or better performing than current low energy fluoropolymer coatings.

In one aspect, a polymer is described wherein the polymer is derived from
(a) a fluorinated monomer selected from
  (i) $C_nF_{(2n+1)}(CH_2)_zOC(=O)CR=CH_2$ wherein n is an integer selected from 1 to 8, z is an integer selected from 1 to 20, and R is H or $CH_3$; and
  (ii) $C_nF_{(2n+1)}SO_2(NR')(CH_2)_zOC(=O)CR=CH_2$ wherein n is an integer selected from 1 to 8, z is an integer selected from 2 to 20, and R is H or $CH_3$, and R' is H or C1-C8 alkyl group; and
(b) a monomer comprising a phosphonic moiety.

In another aspect, an article is described comprising a metallic substrate and a coating layer thereon, wherein the coating layer comprises the polymer described above.

In yet another aspect, a coating solution is described comprising: (I) the polymer derived from (a) a fluorinated monomer selected from
  (i) $C_nF_{(2n+1)}(CH_2)_zOC(=O)CR=CH_2$ wherein n is an integer selected from 1 to 8, z is an integer selected from 1 to 20, and R is H or $CH_3$; and
  (ii) $C_nF_{(2n+1)}SO_2(NR')(CH_2)_zOC(=O)CR=CH_2$ wherein n is an integer selected from 1 to 8, z is an integer selected from 2 to 20, and R is H or $CH_3$, and R' is H or C1-C8 alkyl group, and (b) a monomer comprising a phosphonic moiety; and (II) a solvent.

Still further, in another aspect, a method of using is described comprising:
  (i) providing the coating solution above; and
  (ii) contacting the coating solution with a metallic surface.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term
"a", "an", and "the" are used interchangeably and mean one or more;

"and/or" is used to indicate one or both stated cases may occur, for example A and/or B includes, (A and B) and (A or B);

"alkyl" refers to a monovalent moiety formed by abstraction of a hydrogen atom from an alkane;

"phosphonic moiety" refers to a group comprising the formula $-P(=O)(OX)_2$ attached directly to a carbon atom where X is independently selected from H, alkali metal, alkyl, cycloalkyl, ammonium, and ammonium substituted with an alkyl or cycloalkyl; and "polymer" refers to a macrostructure having a number average molecular weight (Mn) of at least 10,000 dalton to at most 50,000 dalton.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

Fluorochemical treatments are known to generate low energy surfaces. The fluoropolymer compositions disclosed herein can be applied to metallic substrates to create a low energy surface that is robust (e.g., more resistant to corrosion, more resistant to abrasion, etc.).

The polymers described herein are derived from a fluorinated monomer and a monomer comprising a phosphonic moiety.

The fluorinated monomer is selected from at least one of Formulas (I) and (II).

$$C_nF_{(2n+1)}(CH_2)_zOC(=O)CR=CH_2 \qquad (I)$$

wherein n is an integer selected from 1 to 8 (more preferably 1 to 6), z is an integer selected from 1 to 20 (more preferably 1 to 6), and R is H or $CH_3$; and

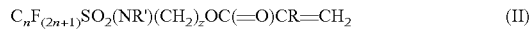
$$C_nF_{(2n+1)}SO_2(NR')(CH_2)_zOC(=O)CR=CH_2 \qquad (II)$$

wherein n is an integer selected from 1 to 8 (more preferably 1 to 6), z is an integer selected from 2 to 20 (more preferably 2 to 4), and R is H or $CH_3$, and R' is H or an alkyl group containing 1 to 8 carbon atoms (more preferably 1 to 3). The alkyl group can be linear or branched.

Exemplary fluorinated monomers include: $CF_3CF_2CF_2CH_2-O-C(=O)C(CH_3)=CH_2$; $CF_3CF_2CF_2CF_2-S(=O)_2N(CH_3)CH_2CH_2-O-C(=O)C(CH_3)=CH_2$; $C_8F_{17}SO_2N(C_2H_5)CH_2CH_2OC(=O)C(CH_3)=CH_2$; $C_8F_{17}CH_2CH_2OC(=O)CH=CH_2$; $C_8F_{17}SO_2N(C_3H_7)CH_2CH_2OC(=O)CH=CH_2$; $C_8F_{17}SO_2N(C_3H_7)CH_2CH_2OC(=O)CH=CH_2$; and $C_6F_{13}SO_2N(CH_3)CH_2CH_2OC(=O)C(CH_3)=CH_2$.

The fluorinated monomers described above are polymerized with a monomer comprising a phosphonic moiety. The monomer comprising the phosphonic moiety may be non-fluorinated. In one embodiment, the monomer comprising a phosphonic moiety is selected from a vinyl phosphonic acid, an allyl phosphonic acid, a (meth)acryloylphosphonic acid, and combinations thereof and salts thereof. In one embodiment, the monomer comprising the phosphonic moiety is of the formula: $CH_2=CX-(C(=O)O)_n-R_m-PO_3H_2$ and salts thereof, wherein X is H or $CH_3$, n is 0 or 1, m is 0 or 1, R is a divalent alkyl group optionally comprising a catenated heteroatom (e.g., O, S, and N) comprising 1-20 or even 1-4 carbon atoms.

Exemplary monomer include $CH_2=CHPO_3H_2$, $CH_2=CHCH_2PO_3H_2$, and $CH_2=C(CH_3)C(=O)OCH_2CH_2PO_3H_2$ and salts thereof. The salt may be selected from an ammonium salt, alkali and alkaline earth metal salts (e.g., a sodium salt, a calcium salt), and the like.

The fluorinated monomer of Formulas (I) and/or (II) and the monomer comprising a phosphonic moiety can be polymerized together, along with additional monomers if desired, using techniques known in the art. For example, the monomers are reacted together typically in the presence of an initiator to join the monomers together forming a macromolecule comprising interpolymerized units from both the fluorinated monomer and the monomer comprising the phosphonic moiety. Typically the polymer comprises a random distribution of these monomers and has a distribution of molecular weights. The polymerization can be carried out at any temperature suitable for conducting an organic free radical reaction. Temperature and solvent for a particular polymerization can be selected by those skilled in the art based on considerations such as solubility of reagents, temperature required for the use of a particular initiator, and desired molecular weight. While it is not practical to enumerate a particular temperature suitable for all initiators and all solvents, generally suitable temperatures are in the range of about 30° C. to about 200° C. Exemplary solvents can include polar hydrocarbon solvents such as ethyl acetate and propylene glycolmethyl ether acetate; hydrofluoroethers; and combinations thereof. See the solvents described below in the coating solution for more detail.

The resulting polymerized solution comprising the polymer of the present disclosure may be used as is or the resulting polymer may be isolated from the liquid phase.

Although not wanting to be limited by theory, it is believed that the interpolymerized fluorinated monomers provide the surface modifying properties (e.g., low energy), while the phosphonic moiety anchors the polymers disclosed herein to the substrate surface. In one embodiment, the resulting polymer is derived from at least 95 wt % or even at least 97 wt % to at most 99 wt % of the fluorinated monomer. In one embodiment, the resulting polymer comprises at least 1, 3, or even 5 wt % of the monomer comprising a phosphonic moiety. In one embodiment, the resulting polymer comprises at most 10 wt % of the monomer comprising a phosphonic moiety. If too much of monomer comprising a phosphonic moiety is used, the polymer may become insoluble in the coating solvent making coating difficult and/or the properties (e.g., release) of the modified substrate surface may be compromised.

In one embodiment, additional monomers may be polymerized along with the fluorinated monomer and the monomer comprising a phosphonic moiety to improve the manufacture and/or coating of the polymer and/or modify the properties of the resulting polymer. In one embodiment, a short chain monomer comprising 1 to 8 carbon atoms (such as acrylic acid) can be used. In one embodiment, dye-containing monomers such as those described in U.S. Pat. No. 6,894,105 (Parent et al.), herein incorporated by reference, can be used, e.g., to visualize the coating. Typically, the resulting polymer comprises at least 0.1, 0.5, 1, 3, or even 5 wt % of these additional monomers and at most 20, or even 10 wt %.

In one embodiment, the polymer of the present disclosure consists essentially of the fluorinated monomer and the monomer comprising a phosphonic moiety. In other words, less than 5, 3, 2, 1, 0.5, 0.2, or even 0.1 mole % of a monomer other than the fluorinated monomers of Formula I and II and the monomer comprising a phosphonic moiety are present.

In one embodiment, the resulting polymer is substantially free of a fluoropolyether moiety. A fluoropolyether moiety refers to a segment of the polymer having three saturated or unsaturated hydrocarbon groups linked with oxygen atoms (i.e., there is at least two catenated oxygen atoms). The hydrocarbon groups can have a linear or branched structure. At least one, and typically two or more, of the hydrocarbon groups has at least one hydrogen atom replaced with a fluorine atom. In one embodiment, all of the carbon-hydrogen bonds are replaced with carbon-fluorine bonds. In one embodiment, the fluoropolyether moiety is on a pendent group off of the polymer backbone. Exemplary fluoropolyether segments include: $C_nF_{(2n+1)}O(CF(CF_3)CF_2O)_zCF(CF_3)$—X—C(=O)CR— wherein n is an integer selected from 1 to 3, z is an integer selected from 5 to 100, X is a linking group selected from NH and $CH_2O$, and R is H or $CH_3$.

The fluorinated polymers of the present disclosure comprising the phosphonic moiety may be advantageously applied to a variety of metallic (including metals and metal alloys) substrates, although other substrates are also useful. The metal is typically a solid at room temperature. Exemplary metal and/or metal alloys include chromium, aluminum, copper, nickel, (e.g., stainless) steel, titanium, silver, and alloys and mixtures thereof. The polymers of the present disclosure may be applied to the native oxide surface layer of the metal (e.g., metal oxides and mixed metal oxides and nitrides including alumina, titania, titanium nitride, and indium tin oxide) or the surface of the substrate may be cleaned (e.g., abrading, washing, etc.) prior to contact with the polymers of the present disclosure.

Typically, the polymers of the present disclosure are applied as a layer to at least a portion, desirably all, of the substrate surface to be treated. Desirably, the polymer coats the surface of the substrate.

In one embodiment, the polymer of the present disclosure is applied directly to the surface. For example, by extrusion of the molten polymer or applying plugs of the dried polymer onto the substrate surface and then applying heat (for example, at temperatures which allow the polymer to flow, e.g., 140° C.). Alternatively, the polymer may be buffed onto the substrate surface.

In another embodiment, the polymer is applied as a solution (e.g., a coating solution) onto the substrate surface. The coating solution may be applied onto the substrate via spray coating, dip coating, wiping, injecting (via a syringe), or other coating techniques known in the art.

The coating solution comprises the polymer of the present disclosure along with a solvent to reduce the viscosity generating a flowable composition. Optionally additives e.g., dyes, pigments or other fillers, may be added to the coating solution. The solvent(s) used to typically include those that are substantially inert (i.e., substantially nonreactive with the polymers of the present disclosure), aprotic, and capable of dispersing or dissolving the polymers. The solvent may be the same solvent used for the polymerization. Exemplary solvents include non-fluorinated solvents and fluorinated solvents and combinations thereof.

Exemplary non-fluorinated solvents include: alcohols such as isopropyl alcohol, ketones such as methylisobutyl ketone, and propylene glycol ethers such as PGMEA (propyleneglycol methyl ether acetate), ethylene glycol ethers such as ethylene glycol dimethyl ether, alkyl ester solvents such as ethyl or butyl acetate, and ethers such as tetrahydrofuran.

Exemplary fluorinated solvents include hydrofluoroethers. Suitable hydrofluoroethers can be represented by the following general Formula III:

$$R_f^1 - [OR_h]_a \quad (III)$$

where a is an integer of 1 to 3, $R_f^1$ is a monovalent, divalent, or trivalent radical of a perfluoroalkane, perfluoroether, or perfluoropolyether that is linear, branched, cyclic, or combinations thereof; and $R_h$ an alkyl or heteroalkyl group that is linear, branched, cyclic, or combinations thereof. For example, the hydrofluoroether can be methyl perfluorobutyl ether or ethyl perfluorobutyl ether. Exemplary hydrofluoroethers include those available under the trade designations "3M NOVEC 7000 ENGINEERED FLUID", "3M NOVEC 7100 ENGINEERED FLUID", "3M NOVEC 7200 ENGINEERED FLUID", "3M NOVEC 7300 ENGINEERED FLUID", and "3M NOVEC 7500 ENGINEERED FLUID" and "3M NOVEC 7600 ENGINEERED FLUID" from 3M Co., St. Paul, Minn.

After the polymer (coating solution or neat polymer) is applied to the substrate surface, the article may be subsequently dried (air dried or with heat). Optionally, heat can be used, typically at temperatures lower than the Tg of the polymer, e.g., about up to 105-110° C. for at least 5 minutes to remove any residual solvent and/or enhance the bonding of the polymer to the substrate.

Because the polymers of the present disclosure are polymeric in nature, they may provide more robustness to the coating layer. In other words, the coating layers comprising the polymers of the present disclosure may provide corrosion protection to the underlying metallic substrate. The layer of polymer on the substrate surface may be of any thickness, with typical dried thicknesses in the range of at least 5 nanometers (nm), 10 nm, 15 nm, 20 nm, 50 nm, 100 nm, 200 nm, or even 500 nm and up to 5 micrometers (μm), 4 μm, 2 μm, or even 1 μm. The thickness of the layer may be dependent on the % solids of the coating solution and/or the number of layers applied. Advantageously, because of their polymeric nature, single coating applications could be used and still achieve thick coating layers, making the coating process simpler and/or less expensive. The thickness of the layer of polymer on the substrate surface can depend on the application, with thicker coating layers preferred in corrosive environments.

Advantageously, it is believed that the polymers of the present disclosure will change the surface properties of the underlying substrate resulting in a surface, which has among other things, low peel force, and/or large contact angles. In one embodiment, the polymer provides additional protection to the underlying substrate from sprayed/aerosolized particles or noxious gases which may be corrosive. For example, the polymers of the present disclosure may be coated for use in appliances and in automotive, manufacturing, and medical applications.

Selected embodiments of the present disclosure are listed below:

Embodiment 1

A polymer derived from
(a) a fluorinated monomer selected from
(i) $C_nF_{(2n+1)}(CH_2)_zOC(=O)CR=CH_2$ wherein n is an integer selected from 1 to 8, z is an integer selected from 1 to 20, and R is H or $CH_3$;
(ii) $C_nF_{(2n+1)}SO_2(NR')(CH_2)_zOC(=O)CR=CH_2$ wherein n is an integer selected from 1 to 8; z is an integer selected from 2 to 20, and R is H or $CH_3$ and R' is H or C1-C8 alkyl group; and
(b) a monomer comprising a phosphonic moiety.

Embodiment 2

The polymer of embodiment 1, wherein the polymer is substantially free of a fluoropolyether segment.

Embodiment 3

The polymer of any one of the previous embodiments, wherein the polymer is derived from 95-99 wt % of the fluorinated monomer based on the weight of the polymer.

Embodiment 4

The polymer of any one of the previous embodiments, wherein the polymer is derived from 0.1-5 wt % of the monomer comprising a phosophonic moiety based on the weight of the polymer.

Embodiment 5

The polymer of any one of the previous embodiments, wherein the monomer comprising a phosphonic moiety is selected from a vinyl phosphonic acid, an allyl phosphonic acid, and a (meth)acryloylphosphonic acid.

Embodiment 6

The polymer of embodiment 5, wherein the monomer comprising a phosphonic moiety is selected from $CH_2=CHPO_3H_2$, $CH_2=CHCH_2PO_3H_2$, $CH_2=CHC(=O)O(CH_2)_2PO_3H_2$, and salts thereof.

Embodiment 7

The polymer of any one of the previous embodiments, wherein the fluorinated monomer is selected from:
$CF_3CF_2CF_2CH_2-O-C(=O)C(CH_3)=CH_2$;
$CF_3CF_2CF_2CF_2-S(=O)_2N(CH_3)CH_2CH_2-O-C(=O)C(CH_3)=CH_2$; $C_8F_{17}SO_2N(C_2H_5)CH_2CH_2OC(=O)C(CH_3)=CH_2$; $C_8F_{17}CH_2CH_2OC(=O)CH=CH_2$; $C_8F_{17}SO_2N(C_3H_7)CH_2CH_2OC(=O)CH=CH_2$; $C_8F_{17}SO_2N(C_3H_7)CH_2CH_2OC(=O)CH=CH_2$; and $C_6F_{13}SO_2N(CH_3)CH_2CH_2OC(=O)C(CH_3)=CH_2$.

Embodiment 8

The polymer of any one of the previous embodiments, wherein the polymer comprises 1 to 20% by weight of the monomer comprising a phosphonic moiety.

Embodiment 9

The polymer of any one of the previous embodiments, wherein the polymer consists essentially of the fluorinated monomer and the monomer comprising a phosphonic moiety.

Embodiment 10

An article comprising a metallic substrate and a coating layer thereon, wherein the coating layer comprises the polymer of any one of embodiments 1-9.

Embodiment 11

The article of embodiment 10, wherein the metallic substrate comprises a metal selected from aluminum, steel, silver, copper, chrome, and nickel.

Embodiment 12

The article of any one of embodiments 7-8, wherein the coating layer has a thickness of at least 5 nm.

Embodiment 13

A coating solution comprising: (i) the polymer of any one of embodiments 1-9 and (ii) a solvent.

Embodiment 14

The coating solution of embodiment 13, wherein the solvent is a non-fluorinated solvent.

Embodiment 15

The coating solution of embodiment 14, wherein the non-fluorinated solvent is selected from a ketone, a propylene glycol ether, an ethylene glycol ether, an alkyl ester, and an ether.

Embodiment 16

The coating solution of embodiment 13, wherein the solvent is a fluorinated solvent.

Embodiment 17

The coating solution of embodiment 16, wherein the fluorinated solvent is selected from a hydrofluoroether.

Embodiment 18

A method of using comprising:
(i) providing the coating solution of any one of embodiments 13-17; and
(ii) contacting the coating solution with a metallic surface.

Embodiment 19

The method of embodiment 18, wherein the metallic surface comprises a metal selected from aluminum, steel, silver, copper, chrome, and nickel.

Embodiment 20

The method of any one of embodiments 18-19, wherein the metallic surface is contacted with the coating solution via spray coating, dip coating, wiping, or injecting.

Embodiment 21

The method of any one of embodiments 18-20, wherein the metallic surface is clean.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: g=gram, kg=kilograms, min=minutes, mol=mole; cm=centimeter, mm=millimeter, ml=milliliter, L=liter, psi=pressure per square inch, MPa=megaPascals, and wt=weight.

TABLE 1

Materials

| DESIGNATION | DESCRIPTION AND SOURCE |
|---|---|
| AA | Acrylic acid |
| MA | Methacrylic acid |
| FBMA | 2,2,3,3,4,4,4-Heptafluorobutyl methacrylate, available from Sigma-Aldrich Chemical, St. Louis, MO. |
| LUPEROX26M50 | 50 wt. % t-butyl peroctoate in isoparaffinic hydrocarbon blend, available from Atofina, Philadelphia, PA |
| MeFBSEMA | $C_4F_9S(=O)_2N(Me)CH_2CH_2OC(=O)CH=CH_2$, preparation described in U.S. Pat. No. 7,662,896 (Savu et al.) Example 2 |
| NOVEC 7200 | $C_4F_9OC_2H_5$, available from 3M Co., St. Paul, MN under the trade designation "3M NOVEC 7200 ENGINEERED FLUID" |
| PEMA | 2-Phosphonoethyl methacrylate, prepared according to J. Appl. Poly. Sci. 2002, vol. 83 pages 2277-2287 |
| PGMEA | Propyleneglycol methyl ether acetate (1-methoxy-2-propanol acetate), available from Spectrum Chemical Manufacturing Co, Gardena, CA |
| VPA | Vinylphosphonic acid, available from Sigma-Aldrich Chemical, Milwaukee, WI |
| AIBN | azobisisobutyronitrile |

Test Methods

Glass Transition Temperature (Tg)

Glass transition temperatures were measured by Differential Scanning Calorimetry (DSC) using a Q2000 DIFFERENTIAL SCANNING CALORIMETER obtained from TA Instruments, New Castle, Del. Glass transition temperature was determined using a Modulated DSC procedure with a modulation amplitude of ±1° C. per minute and a ramp rate of 3° C. per minute, scanning from −100° C. to 200° C.

Phosphorus Nuclear Magnetic Resonance (NMR)

Samples of phosphonic acid materials (0.7-0.9 gram aliquots) were accurately weighed into 5 mm outer diameter glass NMR tubes, spiked with accurately weighed amounts of tributylphosphine oxide (TBPO) internal standard, and the mixtures were diluted with 0.3-0.4 mL aliquots of deuterated chloroform (CDCl$_3$) solvent, and then 161.9 MHz $^{31}$P-NMR spectra were acquired.

To improve the detection sensitivity of the VPA and P-HEMA structural units, additional 1.0-2.1 gram aliquots of the samples were accurately weighed into small vials, treated with excess quantities of diazomethane, dried to solids, and spiked with accurately weighed amounts of TBPO internal standard. The mixtures were totally redissolved in solvent mixtures consisting of ~50/50 Freon-113/CDCl$_3$, and then additional 161.9 MHz $^{31}$P-NMR spectra were acquired, using an Agilent 400 MHz UNMRS machine.

180° Peel Force Measurement

Aluminum or copper coupons, 2"×8" (~5.1 cm×~20 cm) were sanded with 400 grit sandpaper and then washed with deionized water and rinsed with isopropyl alcohol, and allowed to dry at room temperature.

Half of each coupon was treated by applying a 1.0 wt % solids solution comprising the example or comparative example with a polyurethane foam brush and rinsing off the excess with solvent (typically the same solvent used in the coating solution, e.g., either ethyl acetate or NOVEC 7200). The treated coupons were allowed to dry.

Two ¾" (~1.9 cm) strips of tape (trade designation "SCOTCH MATGIC TAPE" 810 available from 3M CO., St. Paul, Minn.) were applied to each coupon and secured using a 4 lb. (~1.8 kg) roller. The samples were allowed to dwell for at least 24 hours and then subjected to tape peels (180 degree) using a peel tester (IMass Inc., Accord, Mass.). Each peel was approximately 0.5 in (12.7 mm). A total of eight peels were made for each strip of tape, 4 on the coated surface, which were averaged and 4 on the untreated surface (control), which were averaged. The results from the two tape strips were averaged and the results were reported. Force measurements were reported in ounces per inch (oz./in) and also converted to Newtons per decimeter (N/dm).

In one set of experiments, the treated copper coupons, were heated to about 110° C. for about 15 min and then cooled to room temperature just prior to applying the strips of tape. These samples are designated below as heated copper.

Contact Angle Measurement

Copper plates (18 mm×18 mm×0.20 mm thick) were soaked in about 15% nitric acid, rinsed in deionized water, rinsed with acetone, and then dried under a stream of nitrogen.

The examples and comparative examples were diluted to about 1% solids with NOVEC 7200 and dipcoated onto the cleaned copper squares. The coated copper plates were placed in an oven at about 110° C. for about 15 minutes.

Contact angles were measured using a force tensiometer (K100 available from KRÜSS Gmbh, Hamburg, Germany) with the contact angle add-in module installed. The instrument operated by dipping and withdrawing each coated copper plate in a jar of deionized water (or, alternatively, n-hexadecane), recording force vs. immersion depth, then calculating contact angle. Using the known surface tension of water (or n-hexadecane), the unknown contact angle could be calculated. The resulting contact angle was the average of many individual measurements as the coated copper plate was dipped in or withdrawn, and included the whole circumference of the plate rather than a single point on the plate.

In cases where only the static contact angle was known, it was compared with the advancing contract angle which was expected to be a good approximation for it (see *Surface Science Techniques*, G. Bracco, B. Holst (ed), Springer-Verlag Berlin Heidleburg 2013, Contact Angle and Wetting Properties by Y. Yuan, T. R. Lee, page 6).

Immersion Test

Immersion testing was performed according to ASTM E1597-10 (also referred to as "Solatron Water Immersion test").

Example 1 (EX-1): Polymer of FBMA with VPA

The following were added in a flask under positive nitrogen pressure: 98 g FBMA, 2 g VPA, 100 g PGMEA, and 200 g NOVEC 7200 and stirring was started. The batch was heated to 70° C., and then 2.2 g of LUPEROX26M50 was added. The mixture was heated at 74° C. for 18 hours, followed by 89° C. for 2 hours. Then the mixture was cooled to 60° C. 300 g of NOVEC 7200 was added. The mixture was cooled to room temperature, yielding a hazy colorless solution with floating white flakes. The mixture was filtered through 5-7 grams of diatomaceous earth placed on a 0.2 micrometer nylon filter. A total of 564 g of clear liquid was obtained, the solution comprising the copolymer of FBMA and VPA. The clear liquid was used for coating substrates for testing unless otherwise noted.

An aliquot of the clear liquid was treated with diazomethane and analyzed by $^{31}$P-NMR, which showed that the polymer contained 0.210% of the VPA in the polymeric form. Corrected for solids, this corresponded to 1.27% of the polymer solids containing the VPA side chain.

7.9 grams of the clear liquid was dried for 2 hours at 120° C., and a then 1 hour at 160° C., to obtain 1.39 grams of solids, indicating that the solution comprised 16.5 wt. % solids. Tg (DSC) of the dried polymer was found to be 52.39° C.

Example 2 (EX-2): Polymer of FBMA with VPA and AA

The following were added in a flask under positive nitrogen pressure: 98 g FBMA, 2 g VPA, 0.3 g AA, 100 g PGMEA, and 300 g NOVEC 7200 and stirring was started. The batch was heated to 70° C., and then 1 g of LUPEROX26M50 was added. The mixture was heated at 74° C. for 18 hours, then 1 more gram of LUPEROX26M50 was added. The mixture was heated at 89° C. for 2 hours. Then the mixture was cooled to 60° C. 300 g of NOVEC 7200 was added. The mixture was cooled to room temperature, yielding a hazy colorless solution with floating white flakes. The mixture was filtered through 5-7 grams of diatomaceous earth placed on a 0.2 micrometer nylon filter. A total of 667 g of clear liquid was obtained, the solution comprising the copolymer of FBMA and VPA and AA. The clear liquid was used for coating substrates for testing unless otherwise noted.

2.18 grams of the clear liquid was dried for 30 minutes at 120° C. to obtain 0.30 grams of solids, indicating that the solution comprised 13.7 wt. % solids. Tg (DSC) of the dried polymer was found to be 52.14° C.

Example 3 (EX-3): Polymer of MeFBSEMA with VPA and Acrylic Acid

The following were added in a flask under positive nitrogen pressure: 98 g MeFBSEMA, 2 g VPA, 0.3 g AA, 100 g PGMEA, and 300 g NOVEC 7200 and stirring was started. The batch was heated to 70° C., and then 1 g of LUPEROX26M50 was added. The mixture was heated at 74° C. for 18 hours, then 1 more gram of LUPEROX26M50 was added. The mixture was heated at 89° C. for 2 hours. Then the mixture was cooled to 60° C. 617 g of NOVEC 7200 was added. The mixture was cooled to room temperature, yielding a hazy colorless solution with floating white flakes. The mixture was filtered through 5-7 grams of diatomaceous earth placed on a 0.2 micrometer nylon filter. A total of 1118 g of clear liquid was obtained, the solution comprising the copolymer of MeFBSEMA and VPA and AA. The clear liquid was used for coating substrates for testing unless otherwise noted.

An aliquot of the clear liquid was treated with diazomethane and analyzed by $^{31}$P-NMR, which showed that the polymer contained 0.14% of the VPA in the polymeric form. Corrected for solids this corresponded to 1.70% of the polymer solids containing the VPA side chain, which compared well with the 2.0 g per 100 g of monomers charged.

4.37 grams of the clear liquid was dried for 30 minutes at 120° C. and then 1 hour at 160° C. to obtain 0.36 grams of solids, indicating that the solution comprised 8.23 wt. % solids. Tg (DSC) of the dried polymer was found to be 54.73° C.

Example 4: Polymer of FBMA with 2-Phosphonoethyl Methacrylate (PEMA)

The following were added in a flask under positive nitrogen pressure: 2.68 g FBMA, 0.095 g PEMA, and 20 g isopropyl alcohol, and stirring was started. The batch was heated to 70° C., and then 0.019 g of AIBN was added. The mixture was heated at 72° C. for 18 more hours, then the mixture was cooled to room temperature, yielding a precipitate. The solution was decanted from the flask, and the remaining material was dissolved in 25 mL of 2,2,2,-trifluoroethanol ($CF_3CH_2OH$).

1.0 g of the resulting solution was diluted with 100 g of ethyl acetate to generate a coating solution for peel testing.

Comparative Example 1: Polymer of FBMA with Acrylic Acid (and No PVA)

A copolymer was made as in Example 1 except that the 2 g VPA was replaced with 2 g AA and only 2 g of LUPEROX26M50 was used instead of 2.2 g. A total of 1000 g of clear liquid was obtained, the solution comprising the copolymer of FBMA and AA. The clear liquid was used for coating substrates for testing unless otherwise noted.

3.6 grams of the clear liquid was dried for 30 minutes at 120° C., and then 1 hour at 160° C., to obtain 0.6 grams of solids, indicating that the solution comprised 16.6 wt. % solids. Tg (DSC) of the dried polymer was found to be 52.21° C.

Comparative Example 2 (CE-2)

The 1-phosphono-11-(nonafluorobutyl)undecane (i.e., $C_4F_9(CH_2)_{11}P(=O)(OH)_2$) was prepared as in U.S. Pat. No. 6,824,882 (Boardman et al.) Example 2. A about 0.1% solution comprising this molecule in IPA was used for coating substrates.

Comparative Example 3 (CE-3)

Comparative Example 3 was prepared using the same procedure disclosed for Example 3, except that the monomers used were 99 grams of MeFBSEMA and 1 gram of methacrylic acid.

The Examples and Comparative Example above were tested for 180° Peel Force and the results are shown in Tables 2 (aluminum), 3 (copper), and 4 (heated copper). For each sample, a peel force was taken on the coated side and the uncoated side (control) and the average is reported for each sample. Also shown in the table is the % reduction in peel force (coated sample versus the control).

TABLE 2

| | wt. % of dry polymer | | | | | peel force, oz/in (N/dm) | | % reduction in peel force |
|---|---|---|---|---|---|---|---|---|
| Sample | FBMA | Me-FBSMEA | VPA | AA | PEMA | Coated | Control | |
| EX-1 | 98 | 0 | 2 | 0 | 0 | 12.1 (13.2) | 26.6 (29.1) | 54 |
| EX-2 | 97.7 | 0 | 2 | 0.3 | 0 | 11 (12.0) | 27.4 (30.0) | 60 |
| EX-3 | 0 | 97.7 | 2 | 0.3 | 0 | 10.2 (11.2) | 27.6 (30.2) | 62 |
| Ex-4 | 96.6 | 0 | 0 | 0 | 3.4 | 19.7 (21.6) | 35.4 (38.7) | 44 |
| CE-1 | 98 | 0 | 0 | 2 | 0 | 18.8 (20.6) | 25.8 (28.2) | 27 |
| CE-2 | none | none | none | none | none | 13 (14.2) | 25 (27.4) | 48 |

TABLE 3

| | wt. % of dry polymer | | | | peel force, oz/in (N/dm) | | % reduction in peel force |
|---|---|---|---|---|---|---|---|
| Sample | FBMA | Me-FBSMEA | VPA | AA | Coated | Control | |
| EX-1 | 98 | 0 | 2 | 0 | 14.5 (15.9) | 22.8 (25.0) | 36 |
| EX-2 | 97.7 | 0 | 2 | 0.3 | 15.6 (17.1) | 25.2 (27.6) | 38 |
| EX-3 | 0 | 97.7 | 2 | 0.3 | 12.6 (13.8) | 22.6 (24.7) | 44 |
| CE-2 | none | none | none | none | 11.5 (12.6) | 26.4 (28.9) | 56 |

TABLE 4

| | wt. % of dry polymer | | | | peel force, oz/in (N/dm) | | % reduction in peel force |
|---|---|---|---|---|---|---|---|
| Sample | FBMA | Me-FBSMEA | VPA | AA | Coated | Control | |
| EX-2 | 97.7 | 0 | 2 | 0.3 | 11.2 (12.2) | 16.5 (18.0) | 32 |
| EX-3 | 0 | 97.7 | 2 | 0.3 | 4.1 (4.49) | 16.6 (18.2) | 75 |
| CE-2 | none | none | none | none | 12.6 (13.8) | 16.3 (17.8) | 22 |

The Examples and Comparative Example above were tested for contact angle measurements using the method disclosed above for both water and n-hexadecane. Table 5 below summarized the advancing and receding contact angles for the polymers of the present disclosure on various substrates. The data for CE-2 on Al was taken from U.S. Pat. No. 6,824,882 (Boardman et al.).

TABLE 5

| | | Contact Angle | | | | |
|---|---|---|---|---|---|---|
| Sample | Metal | static water* | Adv water | Rec water | Adv hexadecane | Rec hexadecane |
| Control | Cu | 105 (A) | 105 | 37 | 20 | 4.3 |
| CE-2 | Cu | 115 | 121 | 105 | 79 | 64 |
| CE-2 | Al | 114 | 120 | 110 | 73 | 56 |
| EX-1 | Cu | 117 (A) | 117 | 84 | 67 | 47 |
| EX-2 | Cu | 115 (A) | 115 | 81 | 66 | 47 |
| EX-3 | Cu | 118 (A) | 118 | 71 | 68 | 55 |

*Advancing angle (A) was used when static was unavailable

The clear liquid from EX-3 and CE-3 were both diluted to 4% solids with NOVEC 7200 and spray coated onto separate circuitboards (IPC-B-25A test board that was 0.059 inch (~1.5 mm) thick obtained from TRC Circuit Inc). The coated boards then were heated for one hour at 110° C. Both circuitboards had leads soldered onto them and were evaluated in the Solatron Water Immersion test described above. The results are shown in Table 6 below.

TABLE 6

| Current over time for Salt Water Immersion of Coated Circuit Board | | |
|---|---|---|
| Time, Minutes | CE-3 MeFBSEMA/MA 99/1 Amps | EX-3 MeFBSEMA/VPA/AA 97.7/2/0.3 Amps |
| 5 | 11.61E−05 | 5.15E−05 |
| 10 | 12.05E−05 | 4.98E−05 |
| 30 | 13.01E−05 | 3.83E−05 |
| 60 | 13.37E−05 | 1.42E−05 |

Table 6 shows that the current leakage of the coating of EX-3 was about 11% that of the coating of CE-3 (14.2 microamps versus 133.7 microamps, respectively), at equilibrium after 60 minutes of passing current though the immersed circuit board.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A polymer derived from
   (a) a fluorinated monomer comprising at least one of
      (i) $C_nF_{(2n+1)}(CH_2)_zOC(=O)CR=CH_2$ wherein n is an integer selected from 1 to 8, z is an integer selected from 1 to 20, and R is H or $CH_3$; and
      (ii) $C_nF_{(2n+1)}SO_2(NR')(CH_2)_zOC(=O)CR=CH_2$ wherein n is an integer selected from 1 to 8; z is an integer selected from 3 to 20, and R is H or $CH_3$ and R' is H or C1-C8 alkyl group, wherein the fluorinated monomer is selected from a group consisting of $CF_3CF_2CF_2CH_2$—O—$C(=O)C(CH_3)=CH_2$; and $C_8F_{17}CH_2CH_2OC(=O)CH=CH_2$" after "alkyl group"; and
   (b) a monomer comprising a phosphonic moiety, wherein the phosphonic moiety is selected from a group consisting of: —$CH_2=CHPO_3H_2$, $CH_2=CHCH_2PO_3H_2$, and $CH_2=CHC(=O)O(CH_2)_2PO_3H_2$.

2. The polymer of claim 1, wherein the polymer is substantially free of a fluoropolyether segment.

3. An article comprising a metallic substrate and a coating layer thereon, wherein the coating layer comprises the polymer of claim 1.

4. The article of claim 3, wherein the metallic substrate comprises a metal, wherein the metal comprises at least one of aluminum, steel, silver, copper, chrome, and nickel.

5. The article of claim 4, wherein the coating layer has a thickness of at least 5 nm.

6. A coating solution comprising:
   (i) the polymer of claim 1 and (ii) a solvent.

7. A method of using comprising:
   (i) providing the coating solution of claim 6; and
   (ii) contacting the coating solution with a metallic surface.

8. The polymer of claim 1, wherein the polymer is derived from 0.1-5 wt % of the monomer comprising a phosphonic moiety based on the weight of the polymer.

9. The polymer of claim 1, wherein the polymer comprises 1 to 20% by weight of the monomer comprising a phosphonic moiety.

10. The polymer of claim 1, wherein the polymer consists essentially of the fluorinated monomer and the monomer comprising a phosphonic moiety.

11. The polymer of any claim 1, wherein the polymer is derived from 95-99 wt % of the fluorinated monomer based on the weight of the polymer.

12. The coating solution of claim 6, wherein the solvent is a non-fluorinated solvent.

13. The coating solution of claim 6, wherein the solvent is a fluorinated solvent.

14. The method of claim 7, wherein the metallic surface comprises a metal, wherein the metal comprises at least one of aluminum, steel, silver, copper, chrome, and nickel.

15. The method of claim 7, wherein the metallic surface is contacted with the coating solution via spray coating, dip coating, wiping, or injecting.

16. The method of claim 7, wherein the metallic surface is clean.

17. The article of claim 1 wherein the polymer further comprises (c) acrylic acid.

18. The article of claim 17 wherein the polymer comprises:
   at least 95 wt. % of said fluorinated monomer (a);
   at least 1 wt. % of monomer comprising a phosphonic moiety (b); and
   at least 0.1 wt. % acrylic acid.

* * * * *